Dec. 24, 1968  R. C. ZEIDLER  3,417,844
CLUTCH ACTUATING MECHANISM
Filed Feb. 8, 1967
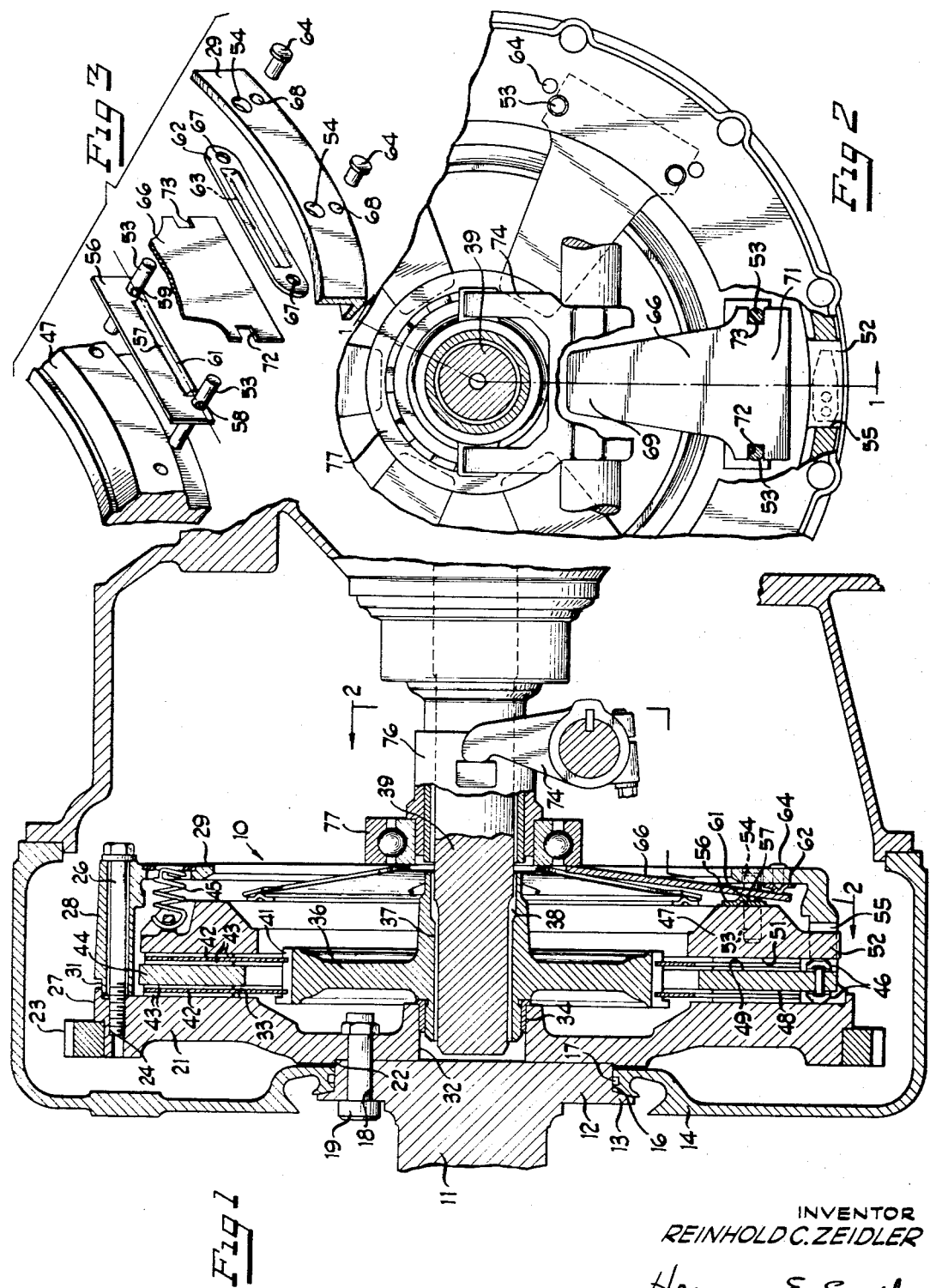
INVENTOR
REINHOLD C. ZEIDLER
BY Herman E. Smith
ATTORNEY United States Patent Office 3,417,844
Patented Dec. 24, 1968

3,417,844
CLUTCH ACTUATING MECHANISM
Reinhold C. Zeidler, Detroit, Mich., assignor to Borg-Warner Corporation, Chicago, Ill., a corporation of Illinois
Filed Feb. 8, 1967, Ser. No. 614,647
3 Claims. (Cl. 192—70.3)

ABSTRACT OF THE DISCLOSURE

A friction disc clutch assembly in which the force multiplying actuating lever apparatus includes a number of accurately positioned parts arranged to minimize slippage between actuating members and thereby reduce friction and wear.

Summary of the invention

The present invention relates generally to clutches of the springless type wherein the force applied by the pressure plate is provided by a spring force remote from the clutch and which acts through the clutch bearing and is multiplied by the clutch levers.

An object of the improved clutch construction of the present invention is to provide an actuating mechanism of simplified construction arranged and constructed so as to facilitate the cooling and/or lubrication of the friction members thereof.

Another object of the invention is to provide an improved clutch actuating mechanism having easily replaceable wear members.

A further object of the invention is to provide an improved clutch construction facilitating reconditioning and repair.

A still further object of the invention is to provide a force multiplying linkage for the actuating mechanism of a clutch assembly of simplified construction.

These and other objects of the present invention will become more apparent from the following description together with the drawings.

Brief description of the drawing

In the drawing:

FIGURE 1 is a section view of a clutch assembly according to the present invention;

FIGURE 2 is a fragmentary end view of the clutch assembly of the present invention taken along the line 2—2 of FIGURE 1; and FIGURE 3 is a fragmentary exploded perspective view of a portion of the clutch actuating linkage of the present invention.

Description of the preferred embodiment

Referring now in greater detail to the drawing and particularly FIGURE 1 thereof a friction clutch assembly according to the present invention is indicated generally by the reference character 10. An input shaft 11 is frictionally coupled to a driven shaft 39 by means of the friction plates 42 which are gripped between pressure plate 47 and flywheel 21. Frictional gripping of friction plates 42 is accomplished by the actuating mechanism including arm 74, sleeve 76 and bearing 77 in cooperation with the force multiplying lever 66.

Power shaft 11 extends from a prime mover not shown in the drawing, for example, may be the crankshaft of an internal combustion engine. Power shaft 11 is provided with a flanged end portion 12 accommodating a sealing lip 13 engageable with a portion of housing 14. A sealing surface 16 on flanged end portion 12 cooperates with sealing ring 17 to provide a fluid tight joint between the rotating power shaft 11 and the stationary housing 14. The flanged end portion 12 of power shaft 11 also includes a pattern of bolt holes 18 accommodating cap screws 19 which secure flywheel 21 to power shaft 11 for rotation therewith.

Flywheel 21 is provided with a recess 22 and an annular lip 27 which are concentric with respect to each other and central bore 32. The recess 22 is adapted to mate with the flanged end portion to assure concentricity of flywheel 21 with power shaft 11. Annular lip 27 in turn mates with the circumferential surface 31 to assure concentricity of reaction member 28 with flywheel 21 and power shaft 11. A pattern of threaded bolt holes 24 extends around an outer portion of flywheel 21 for reception of cap screws 26. Annular reaction member 28 is secured to flywheel 21 by means of cap screws 26 and includes a radially, inwardly extending flange portion 29 which forms an annular pocket with the friction surface 33 of flywheel 21. The outer peripheral portion of flywheel 21 includes a ring gear 23 for engagement with conventional starting apparatus not shown in the drawing. Central portion 32 of flywheel 21 forms a bearing seat for bushing 34 which supports splined spider 36 in concentric alignment with power shaft 11.

Splined spider 36 is provided with a complement of internal splines engageable with a set of matching external splines 38 on driven shaft 39. The rim portion of splined spider 36 includes a complement of external splines 41 adapted to mesh with matching serrations on the inner perimeter of annular friction plates 42. The meshing of splines 41 with portions of friction plate 42 provides a rotary drive connection while permitting axial sliding movement of the friction plates with respect to the spider. While a pair of friction plates 42 have been shown in the drawing for purposes of illustration, the assembly is susceptible to modification for utilizing other numbers of friction plates to suit particular service requirements.

As shown each friction plate 42 includes a pair of friction liners 43 on opposite faces thereof. The two friction plates 42 are spaced apart by an intermediate drive plate 44. When the clutch pedal is depressed, the rocker shaft rotates arm 74 in the clockwise direction; retractor springs 45 exert a pull on pressure plate 47 which acts through levers 66 on bearing 77 and sleeve 76 causing them to follow the movement of arm 74. Each face, 48, 49 of intermediate drive plate 44 has leaf springs 46, 46 rivited thereto which bear respectively on flywheel 21 and a lug 52 of annular pressure plate 47. Springs 46, 46 thus urge intermediate drive plate 44 away from flywheel 21 while at the same time urging pressure plate 47 away from intermediate drive plate 44. This spring action provides a clearance space between friction surface 33 of flywheel 21 and face 48 of intermediate drive plate 44. It also provides another similar clearance space between face 49 of intermediate drive plate 44 and friction surface 51 of pressure plate 47. Each of these clearance spaces is wider than a respective friction plate 42 and its associated friction liners in order to provide running clearance when the clutch is released. Thus when pressure plate 47 is moved axially away from flywheel 21 by retractor springs 45 no frictional gripping engagement exists between shaft 39 and flywheel 21 through the spider 36.

Annular pressure plate 47 is provided with a plurality of lugs 52 projecting therefrom into engagement with matched slots 55 in the rim of reaction member 28. Pressure plate 47 is thus driven and centralized with respect to annular member 28 and flywheel 21.

As shown more clearly in FIGURE 3, each pair of pins 53, 53 are a tight fit in pressure plate 47 and support inner bracket 56 on pressure plate 47. Each inner bracket 56 includes a straight elongated ridge 57 extending along an intermediate portion thereof between mounting apertures 58, 59. Ridge 57 is formed with a crest 61 which extends along a line tangent to the edges of apertures 58, 59. Thus pins 53, 53 serve to accurately orient crest 61 of inner brackets 56 with respect to the surfaces 72, 73 of lever 66. By having the peak of crest 61 in line with the point of contact between the lever and pins, minimum slippage occurs between the lever and crest and lever and pins upon actuation of the lever. This is of importance when releasing or engaging the clutch at high engine RPM. Under this condition the centrifugal force of the lever causes heavy loading against pins 53 at the same time that the lever applies a heavy loading on ridges 61 and 63. Minimizing slippage under these and other conditions reduces friction and wear.

An outer bracket 62 is riveted to radial flange portion 29 of reaction member 28 radially outwardly of each inner bracket 57 by means of rivets 64, 64. Each outer bracket 62 is also provided with an elongated intermediate ridge portion 63, the position of which is established by bracket apertures 67, 67 and rivet apertures 68, 68. The inner and outer brackets 56 and 62 thus provide readily replaceable chordally oriented fulcrums in the form of ridges 57 and 63 which can be accurately located with respect to the axis of rotation of the annular assembly when repair and replacement become necessary.

The ridges being straight permit line contact of a rolling nature across the full width of the lever thus providing uniform loading and uniform stress in the related parts regardless of the operating angle of the lever. In contrast other clutches currently manufactured have fulcrums that are circular and integral with the pressure plate and clutch cover plate members which cause unequal loading and subsequent wear. Replacement of such worn major parts is costly.

Another component cooperating with brackets 56, 62 to facilitate reconditioning of the clutch assembly is the force multiplying lever 66. Each lever 66 is in the form of a flat plate having a narrower inner end portion 69 and a wider outer end portion 71. The wider outer end portion 71 includes a pair of slots 72, 73 adapted to embrace the pair of pins 53, 53. The cooperation of slots 72, 73 with the pins 53, 53 serve to orient the lever 66 so that the wider outer end portion 71 extends between flange portion 29 of reaction member 28 and pressure plate 47 bearing against brackets 56 and 62. Slots 72, 73 are slightly over-sized with respect to pins 53, 53 to permit the tilting action necessary for axial movement of pressure plate 47. The wider outer end portion 71 of lever 66 serves to counter-balance the lever centrifugally. Centrifugally the lever pivots about the points of contact 72, 73 between the lever and the inner side of pins 53, 53. In angular positions out of a plane normal to the axis of rotation any unbalance in the lever tends to increase the angle with respect to the normal plane. Balance is achieved by adding mass in the lever as required beyond the pivot point.

As shown in FIGURE 2, each lever 66 is tapered toward its inner end 69 permitting the use of a plurality of such levers while allowing ample spacing between levers for the introduction of air or fluid to the friction plates 42 for cooling or lubrication.

Each lever 66 being flat in thickness and tapered in width functions to exert a prying action for moving pressure plate 47 away from flange 29 of reaction member 28 and is also subject to flexure like a leaf spring. Thus when arm 74 is turned to move actuating sleeve 76 and its bearing 77 against the inner end portion 69 of levers 66, each lever of the group flexes sufficiently so that the actuating force is shared by the group of levers thereby promoting uniform loading of the pressure plate and smooth engagement of the clutch assembly.

While a preferred embodiment of the invention has been shown and described, it is to be understood that variations and modifications thereof are included within the spirit of the invention and the scope of the following claims.

I claim:
1. In a friction clutch assembly (10) including a flywheel (21), a reaction member (28), a shaft (39), a friction plate (42) mounted on said shaft (39) for rotation therewith, said friction plate (42) being axially movable with respect to said shaft (39) toward and from said flywheel (21), and an annular pressure plate (47) disposed between said friction plate (42) and said reaction member (28), the improvement in means for clamping said friction plate (42) between said flywheel (21) and pressure plate (47) comprising: at least one radially extending lever (66) having an outer end (71) including a pair of spaced slots (72, 73); at least one fulcrum plate bracket (56) having an elongated ridge (57) extending along a portion thereof including a pair of spaced apertures (58, 59) adjacent respective ends of said ridge (57) and at least one pair of pins (53, 53) fixed in said pressure plate (47) and extending axially therefrom into engagement with said apertures (58, 59) of said bracket (56) and spaced slots (72, 73) of lever (66), said pins serving the dual purpose of positioning said lever (66) and said fulcrum plate bracket (56) with respect to said clutch assembly.

2. The combination according to claim 1 in which said ridge (57) in said fulcrum plate bracket (56) includes a straight crest (61), the line of contact of said crest (61) with said lever (66) being substantially in alignment with the points of contact of said lever slots, (72, 73) with the radial innnermost sides of said pins (53, 53).

3. The combination according to claim 1 in which removable fulcrum means (56, 62) is provided, one on each side of said lever (66), each of said fulcrum means (56, 62) including a straight ridge portion (57, 63) forming a line of contact with said lever.

References Cited

UNITED STATES PATENTS

| 2,082,655 | 1/1937 | Reed | 192—99 |
| 2,630,897 | 3/1953 | Porter | 192—99 |

BENJAMIN W. WYCHE III, *Primary, Examiner.*

U.S. Cl. X.R.

192—99